US012395792B1

(12) United States Patent
Chen et al.

(10) Patent No.: US 12,395,792 B1
(45) Date of Patent: Aug. 19, 2025

(54) CONCENTRIC CIRCULAR MICROPHONE ARRAYS WITH 3D STEERABLE BEAMFORMERS

(71) Applicant: Northwestern Polytechnical University, Xi'an (CN)

(72) Inventors: Jingdong Chen, Xi'an (CN); Xueqin Luo, Xi'an (CN); Xudong Zhao, Xi'an (CN); Gongping Huang, Xi'an (CN); Jilu Jin, Xi'an (CN); Jacob Benesty, Montreal (CA)

(73) Assignee: Northwestern Polytechnical University, Shaanxi (CN)

( * ) Notice: Subject to any disclaimer, the term of this patent is extended or adjusted under 35 U.S.C. 154(b) by 0 days.

(21) Appl. No.: 19/108,471

(22) PCT Filed: Nov. 24, 2022

(86) PCT No.: PCT/CN2022/134194

§ 371 (c)(1),
(2) Date: Mar. 4, 2025

(87) PCT Pub. No.: WO2024/108515

PCT Pub. Date: May 30, 2024

(51) Int. Cl.
*H04R 3/00* (2006.01)
*H04R 1/40* (2006.01)

(52) U.S. Cl.
CPC ............ *H04R 3/005* (2013.01); *H04R 1/406* (2013.01); *H04R 2201/401* (2013.01); *H04R 2201/405* (2013.01); *H04R 2430/21* (2013.01)

(58) Field of Classification Search
CPC .. H04R 3/005; H04R 1/406; H04R 2201/401; H04R 2201/405; H04R 2430/21
(Continued)

(56) References Cited

U.S. PATENT DOCUMENTS 9,930,448 B1 3/2018 Chen et al.
11,523,212 B2 * 12/2022 Ansai .................... H04R 19/04
(Continued)

FOREIGN PATENT DOCUMENTS

CN 112385245 A 2/2021
CN 114023307 A * 2/2022 ......... G10L 21/0216

OTHER PUBLICATIONS

International Search Report received for PCT/CN2022/134194, dated Aug. 16, 2023, 4 pages.
(Continued)

*Primary Examiner* — William A Jerez Lora
(74) *Attorney, Agent, or Firm* — Zhong Law, LLC

(57) ABSTRACT

A concentric circular microphone array (CCMA) may include a number of omnidirectional microphones and an equal number of directional microphones, wherein the omnidirectional microphones and the directional microphones form a plurality of concentric rings on a substantially planar platform. Each of the plurality of concentric rings includes a subset of the omnidirectional microphones and a subset of the directional microphones (e.g., arranged in mixed pairs of microphones). Responsive to a sound source, the omnidirectional microphones and the directional microphones may respectively generate first and second electronic signals. A target beampattern of $N^{th}$ order may be specified for the CCMA. An $N^{th}$ order beamformer for the CCMA, that is steerable in a three-dimensional space including the sound source, may be determined based on the specified target beampattern. The beamformer may be executed to calculate an estimate of the sound source based on the first electronic signals and the second electronic signals.

20 Claims, 8 Drawing Sheets

(58) Field of Classification Search
USPC ........................................................ 381/91, 92
See application file for complete search history.

(56) References Cited

U.S. PATENT DOCUMENTS

| | | | | |
|---|---|---|---|---|
| 2020/0100025 | A1* | 3/2020 | Shumard | H04R 19/04 |
| 2022/0060818 | A1* | 2/2022 | Hafizovic | H04R 3/005 |
| 2023/0328431 | A1* | 10/2023 | Liu | H04R 29/005 |

OTHER PUBLICATIONS

Written Opinion of the International Searching Authority received for PCT/CN2022/134194, dated Aug. 16, 2023, 4 pages.
Luo et al., On the Design of 3D Steerable Beamformers with Concentric Circular Microphone Arrays, IEEE Sig. Process. Letts., May 2022.

* cited by examiner

CONCENTRIC CIRCULAR MICROPHONE ARRAYS WITH 3D STEERABLE BEAMFORMERS

CROSS-REFERENCE TO RELATED APPLICATIONS

This application is the U.S. National Phase under 35. U.S.C. § 371 of International Application PCT/CN2022/134194, filed Nov. 24, 2022. The disclosure of the above-described application is hereby incorporated by reference in its entirety.

TECHNICAL FIELD

This disclosure relates to differential microphone arrays and, in particular, to constructing concentric circular microphone arrays (CCMAs) with three-dimensionally steerable beamformers.

BACKGROUND

A differential microphone array (DMA) uses signal processing techniques to obtain a directional response to a source sound signal based on differentials of pairs of the source signals received by microphones of the array. DMAs may contain an array of microphone sensors that are responsive to the spatial derivatives of the acoustic pressure field generated by the sound source. The microphones of the DMA may be arranged on a common planar platform according to the microphone array's geometry (e.g., linear, circular, or other array geometries).

The DMA may be communicatively coupled to a processing device (e.g., a digital signal processor (DSP) or a central processing unit (CPU)) that includes circuits programmed to implement a beamformer to calculate an estimate of the sound source. A beamformer includes one or more spatial filters that use the multiple versions of the sound signal captured by the microphones in the microphone array to identify the sound source according to certain optimization rules. A beampattern reflects the sensitivity of the beamformer to a plane wave impinging on the DMA from a particular angular direction. DMAs have been widely used, for example, in speech based communication and human-machine interface systems to extract the speech signals of interest from unwanted signals, e.g., noise and interference.

BRIEF DESCRIPTION OF THE DRAWINGS

The present disclosure is illustrated by way of example implementations, and not by way of limitation, in the figures of the accompanying drawings described below.

DETAILED DESCRIPTION

Figure 1:
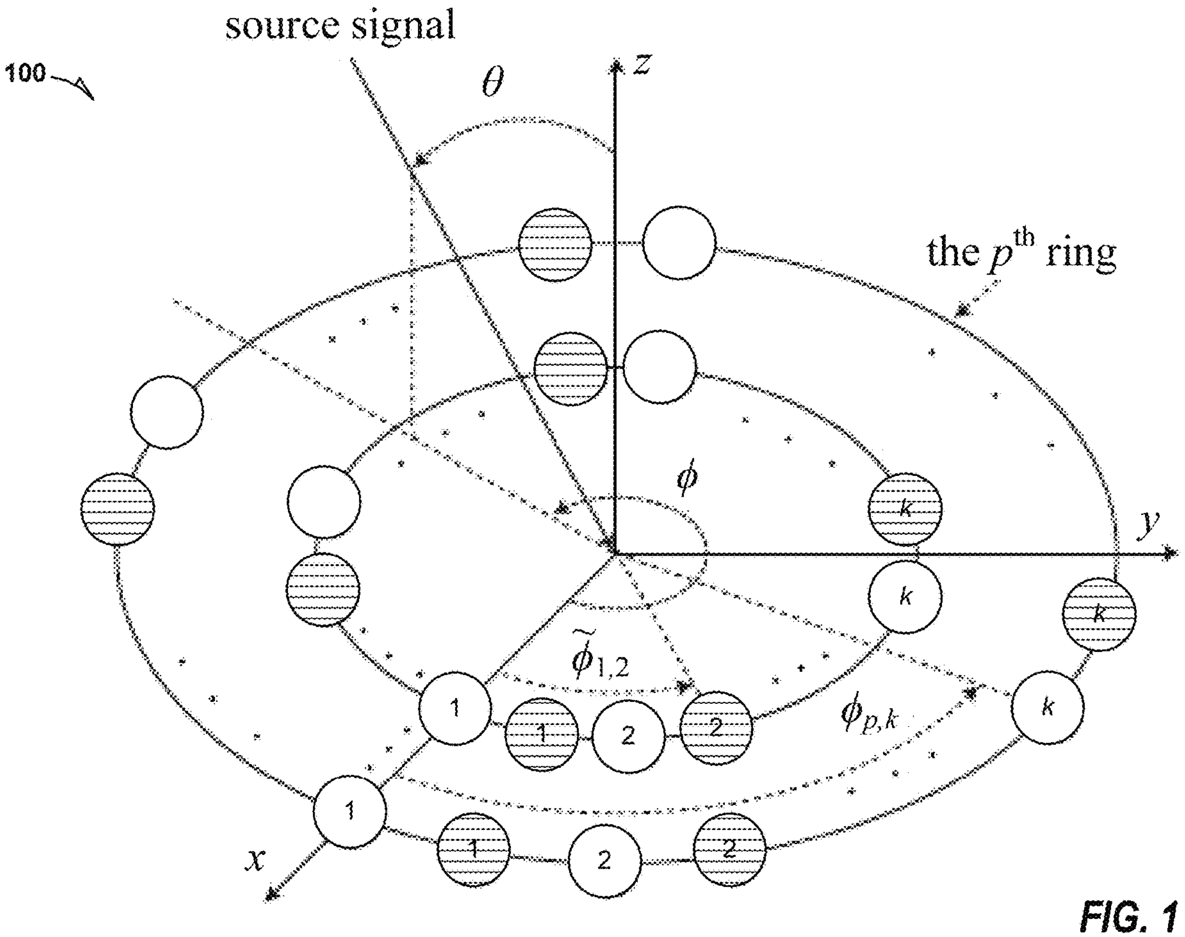
FIG. 1 shows a concentric circular microphone array (CCMA) containing both directional and omnidirectional microphones according to an implementation of the disclosure.

DMAs may measure the derivatives (at different orders) of the sound signals captured by each microphone, where the collection of the sound signals forms an acoustic pressure field associated with the microphone arrays. For example, a first-order DMA beamformer, formed using the difference between a pair of microphones (either adjacent or non-adjacent), may measure the first-order derivative of the acoustic pressure field. A second-order DMA beamformer may be formed using the difference between a pair of two first-order differences of the first-order DMA. The second-order DMA may measure the second-order derivatives of the acoustic pressure field by using at least three microphones. Generally, an $N^{th}$ order DMA beamformer (wherein N is an integer) may measure the $N^{th}$ order derivatives of the acoustic pressure field by using at least N+1 microphones.

A beampattern of a DMA can be quantified in one aspect by the directivity factor (DF) which is the capacity of the beampattern to maximize the ratio of its sensitivity in the look direction to its averaged sensitivity over the whole space. The look direction is an impinging angle of the signal that comes from the desired sound source. The DF of a DMA beampattern may increase with the order of the DMA. However, a higher order DMA can be very sensitive to noise generated by the hardware elements of each microphone of the DMA itself, where this sensitivity may be measured according to a white noise gain (WNG). The design of a beamformer for the DMA may focus on finding an optimal beamforming filter under some criteria (e.g., beampattern, DF, WNG, etc.) for a specified array geometry (e.g., linear, circular, square, spherical, etc.).

As noted above, microphone arrays (e.g., CCMAs) have been used in a wide range of applications for sound and speech signal acquisition. In some applications, such as hearing aids and Bluetooth headsets, the direction of the sound source may be assumed and beamformer steering is not really helpful. However, in many other applications, such as smart televisions (TVs), smart phones, tablets, etc., a steerable beamformer may be desired as signals from the sound source position may not impinge on the microphone array along a look direction of a non-steerable beamformer. For example, a CCMA may be mounted in a smart home virtual assistant device with voice recognition capabilities in order to form a beampattern around the virtual assistant device (e.g., in a plane containing the microphones of the CCMA). CCMAs may often be designed with only omnidirectional sensors (e.g., omnidirectional microphones). However, the beamformers associated with such CCMAs may only be steerable in a plane containing the omnidirectional sensors regardless of the method used for beamforming. Thus, the beamformers associated with CCMAs containing exclusively omnidirectional sensors may not be fully steerable in all directions (or more than directions within a 2D plane) of a 3-dimensional (3D) space due to an incomplete spatial sampling of a 3D sound field. As described herein, a 3D steerable beamformer for a sensor array refers to a beamformer that may be steered away from a plane containing the sensors of the sensor array. Because the performance of a CCMA containing exclusively omnidirectional sensors would suffer significant degradation if the sound sources of interest are located outside of the plane containing the sensors of the CCMA, it is desirable to construct a CCMA that is able to steer the beamformer in all directions in the 3D space to maximize signal acquisition for sound sources of interest (e.g., a user's voice commands) and reduce any noise (e.g., other sounds from sources that are not of interest).

The present disclosure describes approaches to the design of CCMAs with 3D steerable beamformers by using both omnidirectional microphones and directional microphones with dipole patterns. In this disclosure, a directional microphone (also commonly known as a unidirectional microphone or a cardioid microphone) refers to a microphone that picks up sound from an assigned direction. An omnidirectional microphone refers to a microphone that may pick up sound equally from all directions. As noted above, any beamformers used for sound acquisition should have frequency-invariant beampatterns (e.g., since sound signals have a wide frequency band from 20 Hz to 20 kHz for normal hearing), with high directivity so that any unwanted noise and interference may be adequately suppressed while the fidelity of the signal of interest remains preserved. Also as noted above, many applications benefit from the steering flexibility of a beamformer to ensure that a microphone array produces consistent results regardless of the incidence direction (e.g., angle) of any signals from the sound sources of interest.

Generally, such steering flexibility depends not only on the beamforming algorithm, but also on the composition (e.g., types of microphones) and geometry (e.g., positions of microphones) of the sensor array. Certain types of planar microphone arrays, such as circular microphone arrays (CMAs) and CCMAs, may be configured to achieve steering flexibility in the 3D space. For example, beamforming methods with CMAs have been developed with beamformers that are, in general, fully steerable in the plane containing the sensors of the CMA. However, with CMAs, the associated beamformers may suffer from anomalies at certain frequencies leading to significant distortion in beampatterns and degradation in terms of directivity factor (DF) and white noise gain (WNG).

These issues (e.g., distortion and degradation) may be addressed through the use of a CCMA, which may contain multiple CMAs with a common center. As noted above, the beamformers associated with CCMAs may not be fully steerable in a 3D space as a result of an incomplete spatial sampling of a sound wave in the 3D space by the sensors of the CCMA. One way to achieve a more complete spatial sampling is to use spherical microphone arrays together with proper spatial sampling methods. But such 3D spherical microphone arrays occupy more space to mount and may not be able to integrate into many consumer electronics such as smart speakers, smart TVs, etc.

Accordingly, CCMAs implemented in planar platforms (in 2D planes) are highly demanded in a wide spectrum of electronic devices for sound signal acquisition. The present disclosure describes the design of beamformers, for CCMAs, with frequency-invariant beampatterns, which are fully steerable in the 3D space despite an incomplete spatial sampling of a sound wave in the 3D space by omnidirectional sensors of the CCMA. In one implementation, a fully steerable CCMA may be composed of both omnidirectional microphones and directional microphones with dipole patterns. The use of the directional microphones in relation with the omnidirectional microphones allows for the capture of spatial harmonic components of the sound wave that may be missed by CCMAs that contain exclusively omnidirectional sensors. Furthermore, simulations conducted to validate the effectiveness of the proposed CCMA arrays and associated 3D steerable beamformers are also described herein.

Microphone Array

FIG. 1 shows concentric circular microphone array (CCMA) 100 containing both directional and omnidirectional microphones according to an implementation of the present disclosure.

The CCMA 100 may include a number P of rings of sensors (e.g., omnidirectional and directional microphones). All of the sensors of the CCMA 100 may be placed on a common plane (e.g., P rings of sensors on the x-y plane). The radius of the $p^{th}$ (p=1, 2, . . . , P) ring may be denoted as $r_p$ and, where in the p-th ring, there may be $K_p$ omnidirectional microphones and $K_p$ directional microphones (e.g., an equal number of directional and omnidirectional microphones). All of the $K_p$ directional microphones (shown with horizontal stripes) may be uniformly placed along the $p^{th}$ ring, and all of the $K_p$ omnidirectional microphones (shown with no stripes) may also be uniformly placed along the $p^{th}$ ring, thus forming $K_p$ mixed pairs of omnidirectional and directional microphone couplings. In some implementations, the directional microphones may be associated with dipole-shaped beampatterns. In some implementations, the dipole-shaped beampatterns of all directional microphone in the CCMA 100 may be aligned to an axis that is perpendicular to the plane that contains the sensors of the CCMA 100 (e.g., the z-axis), where the axis represents the direction of the directional microphone.

For the CCMA 100 as shown in FIG. 1, implementations of the disclosure may provide a beamformer (e.g., for a far-field case of the CCMA 100 in an anechoic propagation environment) with the main lobe being steered to the direction (θ, ϕ), wherein ϕ is the azimuth angle and θ is the elevation angle, a steering vector of length $$2\mathcal{K}\left(\mathcal{K} = \sum_{p=1}^{P} K_p\right)$$

may be written as $$\underline{d}(\omega,\theta,\phi)=[d^T(\omega,\theta,\phi)\,\tilde{\mathbf{d}}(\omega,\theta,\phi)\cos\theta]^T, \quad (1)$$

where the superscript T is the transpose operator, ω=2πf is the angular frequency and f is the temporal frequency. Furthermore, $$d(\omega,\theta,\phi)=[d_1^T(\omega,\theta,\phi)\ \ldots\ d_P^T(\omega,\theta,\phi)]^T, \quad (2)$$

$$\text{and } \tilde{\mathbf{d}}(\omega,\theta,\phi)=[\tilde{\mathbf{d}}_1^T(\omega,\theta,\phi)\ \ldots\ \tilde{\mathbf{d}}_P^T(\omega,\theta,\phi)]^T, \quad (3)$$

with $$d_p(\omega,\theta,\phi)=[\zeta_{p,1}(\omega,\theta,\phi)\ \ldots\ \zeta_{p,K_p}(\omega,\theta,\phi)]^T, \quad (4)$$

$$\text{and } \tilde{\mathbf{d}}_p(\omega,\theta,\phi)=[\varsigma_{p,1}(\omega,\theta,\phi)\ \ldots\ \varsigma_{p,K_p}(\omega,\theta,\phi)]^T, \quad (5)$$

and with $$\zeta_{p,k}(\omega,\theta,\phi)=e^{J\bar{\omega}_p \cos(\phi-\phi_{p,k})\sin\theta},\ k=1, \ldots, K_p, \quad (6)$$

$$\text{and } \varsigma_{p,k}(\omega,\theta,\phi)=e^{J\bar{\omega}_p \cos(\phi-\tilde{\phi}_{p,k})\sin\theta},\ k=1, \ldots, K_p, \quad (7)$$

wherein J is the imaginary unit with $j^2=-1$, $\bar{\omega}_p=\omega r_p/c$, $\phi_{p,k}=2\pi(k-1)/K_p$ is the azimuth angular position of the $k^{th}$ ($k=1, 2, \ldots, K_p$) omnidirectional microphone on the $p^{th}$ ($p=1, 2, \ldots, P$) ring, and $\tilde{\phi}_{p,k}=\pi(2k-1)/K_p$ is the azimuth angular position of the $k^{th}$ ($k=1, 2, \ldots, K_p$) directional microphone on the $p^{th}$ ($p=1, 2, \ldots, P$) ring. Throughout this disclosure, the CCMAs (e.g., CCMA 100) may be assumed to have small inter-element spacing (e.g., smaller than the smallest acoustic wavelength of a specified frequency band) so that the associated beampattern may be an $N^{th}$-order differential beampattern (wherein N is an integer) that is independent of frequency and has high directivity. For example, the maximum distance between any two adjacent microphones (e.g., or microphone pairs) may be set to a distance that is smaller than a wavelength of the impinging plane wave (e.g., sound source signal). The sound source signal incidence angles are $\theta_s$ and $\phi_s$, which is also the look direction for the CCMA 100.

Beamforming for the CCMA 100 may be achieved by applying complex weights, $H^*_{p,k}(\omega)$, where the superscript * denotes complex conjugation, to the output of the $k^{th}$ ($k=1, 2, \ldots, K_p$) omnidirectional microphone on the $p^{th}$ ($p=1, 2, \ldots, P$) ring, and $H^*_{p,k}(\omega)$ to the output of the $k^{th}$ ($k=1, 2, \ldots, K_p$) directional microphone on the $p^{th}$ ($p=1, 2, \ldots, P$) ring, and then by summing all the weighted outputs together, thereby obtaining an estimate of the signal of interest (e.g., the sound source signal). Putting all of the complex weights together in a vector of length $2\mathcal{K}$, results in $$\underline{h}(\omega)=[h^T(\omega)\tilde{h}^T(\omega)]^T, \tag{8}$$

where $$h(\omega)=[h_1^T(\omega)\ h_2^T(\omega)\ \ldots\ h_p^T(\omega)]^T, \tag{9}$$

$$\text{and } \tilde{h}(\omega)=[h_1^T(\omega)\ \tilde{h}_2^T(\omega)\ \ldots\ \tilde{h}_p^T(\omega)]^T, \tag{10}$$

with $$h_p(\omega)=[H_{p,1}(\omega)\ H_{p,2}(\omega)\ \ldots\ H_{p,K_p}(\omega)]^T, \tag{11}$$

$$\text{and } \tilde{h}_p(\omega)=[\tilde{H}_{p,1}(\omega)\ \tilde{H}_{p,2}(\omega)\ \ldots\ \tilde{H}_{p,K_p}(\omega)]^T. \tag{12}$$

For the purpose of a 3D steerable beamformer for the CCMA 100, the distortionless constraint in the desired look direction is needed, i.e., $$\underline{h}(\omega)\underline{d}(\omega,\theta_s,\phi_s)=1. \tag{13}$$

As noted above, three metrics may be used to analyze and evaluate beamforming performance, i.e., the beampattern, the directivity factor (DF), and the white noise gain (WNG). The beampattern, which describes the spatial response of the 3D steerable beamformer for the CCMA 100 to a plane wave (e.g., sound source signal) impinging on the CCMA 100 from the direction θ, may be written as $$\begin{aligned}\mathcal{B}[\underline{h}(\omega), \theta, \phi] &= \underline{h}^H(\omega)\underline{d}(\omega, \theta, \phi) \\ &= \sum_{p=1}^{P}\sum_{k=1}^{K_p} H^*_{p,k}(\omega)\zeta_{p,k}(\omega, \theta, \phi) + \\ &\cos\theta\sum_{p=1}^{P}\sum_{k=1}^{K_p}\tilde{H}^*_{p,k}(\omega)\varsigma_{p,k}(\omega, \theta, \phi).\end{aligned} \tag{14}$$

The WNG, which evaluates the sensitivity of the CCMA 100 to some of its own imperfections, may be written as $$\mathcal{W}[\underline{h}(\omega)] = \frac{|\underline{h}^H(\omega)\underline{d}(\omega, \theta_s, \phi_s)|^2}{\underline{h}^H(\omega)\underline{h}(\omega)}. \tag{15}$$

The DF, which quantifies how directive the beamformer's spatial response is, may be defined for CCMA 100 as $$\mathcal{D}[\underline{h}(\omega)]\frac{|\underline{h}^H(\omega)\underline{d}(\omega, \theta_s, \phi_s)|^2}{\underline{h}^H(\omega)\underline{\Gamma}_d(\omega)\underline{h}(\omega)}, \tag{16}$$

where $$\begin{aligned}\underline{\Gamma}_d(\omega) &= \frac{1}{4\pi}\int_0^{2\pi}\int_0^{\pi}\underline{d}(\omega, \theta, \phi)\underline{d}^H(\omega, \theta, \phi)\sin\theta d\theta d\phi \\ &= \begin{bmatrix}\Gamma_d(\omega) & 0_{\mathcal{K}\times\mathcal{K}} \\ 0_{\mathcal{K}\times\mathcal{K}} & \tilde{\Gamma}_d(\omega)\end{bmatrix},\end{aligned} \tag{17}$$

$0_{\mathcal{K}\times\mathcal{K}}$ is a zero matrix of size $\mathcal{K}\times\mathcal{K}$, the $(i, j)^{th}$ ($i, j=1, 2, \ldots, \mathcal{K}$) element of $\Gamma_d(\omega)$ is given by $$[\Gamma_d(\omega)]_{i,j}=\text{sinc}(\omega\delta_{i,j}/c), \tag{18}$$

with $\delta_{i,j}$ being the distance between the $i^{th}$ omnidirectional microphone and the $j^{th}$ omnidirectional microphone, and the $(i, j)^{th}$ element ($i, j=1, 2, \ldots, \mathcal{K}$) of $\tilde{\Gamma}_d(\omega)$ is $$[\tilde{\Gamma}_d(\omega)]_{i,j} = \begin{cases} 1/3, & i=j \\ \frac{\cosh(\varrho_{i,j})}{(\varrho_{i,j})^2} - \frac{\sinh((\varrho_{i,j})}{(\varrho_{i,j})^3}, & i\neq j\end{cases}, \tag{19}$$

with sinh(•) and cosh(•) respectively being the hyperbolic sine function and the hyperbolic cosine function, $\tilde{\mathcal{N}}_{i,j}=j\omega\tilde{\delta}_{i,j}/c$, and $\tilde{\delta}_{ij}$ being the distance between the $i^{th}$ directional microphone and the $j^{th}$ directional microphone.

In order to design the 3D steerable beamformer for CCMA 100, the ideal $N^{th}$ order directivity pattern with look direction of $(\theta_s, \phi_s)$ may be written as $$\mathcal{B}_N(\theta, \phi) = \sum_{n=0}^{N}\sum_{m=-n}^{n}[a_n^m(\theta_s, \phi_s)] * Y_n^m(\theta, \phi), \tag{20}$$

where $$a_n^m(\theta_s, \phi_s) = \frac{Y_n^m(\theta_s, \phi_s)}{\kappa_N}, \tag{21}$$

with $\kappa_N=(N+1)^2/4\pi$ being a normalization factor, and $$Y_n^m(\theta,\phi)\triangleq\alpha_n^m\mathcal{P}_n^m(\cos\theta)e^{jm\phi}, \tag{22}$$

being the spherical harmonic of order n and degree m, $$\alpha_n^m = \sqrt{\frac{2n+1}{4\pi}\frac{(n-m)!}{(n+m)!}}, \tag{23}$$

and $\mathcal{P}_n^m(\bullet)$ being the associated Legendre function of the first kind.

A plane wave may be expanded into a linear combination of spherical harmonics. Accordingly, the unit amplitude plane waves corresponding to $\zeta_{p,k}(\omega, \theta, \phi)$ in (6) and $\varsigma_{p,k}(\omega,\theta, \phi)$ in (7) may be expanded into two (2) series of spherical harmonics as follows $$\zeta_{p,k}(\omega,\theta,\phi)=e^{j\varpi_p\cos(\phi-\phi_{p,k})\sin\theta}=\sum_{n=0}^{\infty}\sum_{m=-n}^{n}\beta_n(\varpi_p)\left[Y_n^m\left(\frac{\pi}{2},\phi_{p,k}\right)\right]^*Y_n^m(\theta,\phi),\tag{24}$$

and $$\varsigma_{p,k}(\omega,\theta,\phi)=e^{j\varpi_p\cos(\phi-\tilde{\phi}_{p,k})\sin\theta}=\sum_{n=0}^{\infty}\sum_{m=-n}^{n}\beta_n(\varpi_p)\left[Y_n^m\left(\frac{\pi}{2},\tilde{\phi}_{p,k}\right)\right]^*Y_n^m(\theta,\phi),\tag{25}$$

where $\beta_n(\varpi_p)=4\pi j^n\mathcal{J}_n(\varpi_p)$, with $\mathcal{J}_n(\varpi_p)$ being $n^{th}$ order spherical Bessel functions of the first kind. By substituting (24) and (25) into (14), the beampattern may be re-expressed as $$\mathcal{B}[\underline{h}(\omega),\theta,\phi]=\sum_{n=0}^{\infty}\sum_{m=-n}^{n}\mathcal{A}_n^m(\omega)Y_n^m(\theta,\phi)+\cos\theta\sum_{n=0}^{\infty}\sum_{m=-n}^{n}\tilde{\mathcal{A}}_n^m(\omega)Y_n^m(\theta,\phi),\tag{26}$$

where $$\mathcal{A}_n^m(\omega)=\sum_{p=1}^{P}\beta_n(\varpi_p)\sum_{k=1}^{K_p}H_{p,k}^*(\omega)\left[Y_n^m\left(\frac{\pi}{2},\phi_{p,k}\right)\right]^*,\tag{27}$$

and $$\tilde{\mathcal{A}}_n^m(\omega)=\sum_{p=1}^{P}\beta_n(\varpi_p)\sum_{k=1}^{K_p}\tilde{H}_{p,k}^*(\omega)\left[Y_n^m\left(\frac{\pi}{2},\tilde{\phi}_{p,k}\right)\right]^*.\tag{28}$$

The beampattern described by (26) contains two terms. The first term corresponds to the beampattern of a conventional CCMA consisting of only omnidirectional microphones. As is clear from (27), $\mathcal{A}_n^m(\omega)=0$ when (n+m) is an odd number, which implies that some spherical harmonic components may be missing from the spatial sampling of the sound wave by the omnidirectional microphones of the CCMA 100. The design of flexible steerable beamformers for more conventional CCMAs with only omnidirectional sensors may be very difficult because these spherical harmonic components of the sound wave are missing. However, by adding the directional microphones, the missing spherical harmonic components of the soundwave may be compensated for by the second term of the beampattern of (26), with cos θ, which is discussed in more detail below.

The Legendre function $\mathcal{P}_n^m(\mu)$ can be written as the following recurrent form $$\mu\mathcal{P}_n^m(\mu)=\frac{n+1-m}{2n+1}\mathcal{P}_{n+1}^m(\mu)+\frac{n+m}{2n+1}\mathcal{P}_{n-1}^m(\mu).\tag{29}$$

It follows then that $$\cos\theta Y_n^m(\theta,\phi)=\psi_{n+1}^m Y_{n+1}^m(\theta,\phi)+\varphi_{n-1}^m Y_{n-1}^m(\theta,\phi),\tag{30}$$

-continued where $$\psi_n^m=\begin{cases}\frac{\alpha_{n-1}^m(n-m)}{\alpha_n^m(2n-1)}, & |m|\le n-1,\\ 0, & |m|>n-1,\end{cases}\tag{31}$$

and $$\varphi_n^m=\begin{cases}\frac{\alpha_{n+1}^m(n+1+m)}{\alpha_n^m(2n+3)}, & |m|\le n,\\ 0, & |m|>n,\end{cases}\tag{32}$$

By substituting (20) into (26) and limiting the order to N (wherein N is an integer), the beampattern may be written as $$\mathcal{B}[\underline{h}(\omega),\theta,\phi]=\approx\mathcal{B}_N[\underline{h}(\omega),\theta,\phi]=\sum_{n=0}^{N}\sum_{m=-n}^{n}\underline{\mathcal{A}}_n^m(\omega)Y_n^m(\theta,\phi),\tag{33}$$

where $$\underline{\mathcal{A}}_n^m(\omega)\begin{cases}\mathcal{A}_n^m(\omega), & (n+m)\text{ even},\\ \psi_n^m\tilde{\mathcal{A}}_{n-1}^m(\omega)+\varphi_n^m\tilde{\mathcal{A}}_{n+1}^m(\omega), & (n+m)\text{ odd}.\end{cases}\tag{34}$$

To facilitate subsequent beamformer design, (27) and (28) may be formulated in vector form as $$\mathcal{A}_n^m(\omega)=\gamma_n^m\sum_{p=1}^{P}\mathcal{J}_n(\varpi_p)h_p^H(\omega)e_{m,p}=\gamma_n^m h^H(\omega)v_n^m(\omega),\tag{35}$$

and $$\tilde{\mathcal{A}}_n^m(\omega)=\gamma_n^m\sum_{p=1}^{P}\mathcal{J}_n(\varpi_p)\tilde{h}_p^H(\omega)\tilde{e}_{m,p}=\gamma_n^m\tilde{h}^H(\omega)\tilde{v}_n^m(\omega),\tag{36}$$

where $$\gamma_n^m=4\pi j^n Y_n^m\left(\frac{\pi}{2},0\right),\tag{37}$$

$$v_n^m(\omega)=\left[\mathcal{J}_n(\varpi_1)e_{m,}^T\ \cdots\ \mathcal{J}_n(\varpi_P)e_{m,P}^T\right]^T,\tag{38}$$

and $$\tilde{v}_n^m(\omega)=\left[\mathcal{J}_n(\varpi_1)\tilde{e}_{m,1}^T\ \cdots\ \mathcal{J}_n(\varpi_P)\tilde{e}_{m,P}^T\right]^T,\tag{39}$$

with $$e_{m,p}=\left[e^{-jm\phi_{p,1}}\ \ e^{-jm\phi_{p,2}}\ \ \ldots\ \ e^{-jm\phi_{p,K_p}}\right]^T,\tag{40}$$

and $$\tilde{e}_{m,p}=\left[e^{-jm\phi_{p,1}}\ \ e^{-jm\tilde{\phi}_{p,2}}\ \ \ldots\ \ e^{-jm\tilde{\phi}_{p,K_p}}\right]^T.\tag{41}$$

By substituting (35) and (36) into (34) it is clear that $$\underline{\mathcal{A}}_n^m(\omega)=\begin{cases}\tilde{h}^H(\omega)\tilde{g}_n^m(\omega), & (n+m)\text{ is odd},\\ h^H(\omega)g_n^m(\omega), & (n+m)\text{ is even},\end{cases}\tag{42}$$

where $$\tilde{g}_n^m(\omega)=\gamma_{n-1}^m\psi_n^m\tilde{v}_{n-1}^m(\omega)+\gamma_{n+1}^m\varphi_n^m\tilde{v}_{n+1}^m(\omega),\tag{43}$$

and $$g_n^m(\omega)=\gamma_n^m v_n^m(\omega).$$

Now, by equating the beamformer's beampattern as described in (33) to the $N^{th}$-order desired directivity pattern described in (20), the following relationship is found $$\mathcal{A}(\omega)=[a_n^m(\theta_s,\phi_s)]^*. \quad (44)$$

Accordingly, the proper beamforming filters may be obtained by solving the following linear systems $$\begin{cases} \Psi_N(\omega)h(\omega) = a_N(\theta_s, \phi_s), \\ \tilde{\Psi}_N(\omega)\tilde{h}(\omega) = \tilde{a}_N(\theta_s, \phi_s), \end{cases} \quad (45)$$

where $$\Psi_N(\omega) = [\, g_0^0(\omega) \;\; g_1^{-1}(\omega) \;\; \ldots \;\; g_N^N(\omega) \,]^H \quad (46)$$

is of size $\mathcal{N}\times K$, $\mathcal{N}=(N+1)(N+2)/2$, and $$\tilde{\Psi}_N(\omega)=[\tilde{g}_1^{0}(\omega)\ \tilde{g}_2^{-1}(\omega)\ \ldots\ \tilde{g}_N^{N-1}(\omega)]^H \quad (47)$$

is of size $\tilde{\mathcal{N}}\times K$, $\tilde{\mathcal{N}}=N\,(N+1)/2$, and $$a_N(\theta_s,\phi_s)=[a_0^{0}(\theta_s,\phi_s)a_1^{-1}(\theta_s,\phi_s)\ \ldots\ a_N^{N}(\theta_s,\phi_s)]^T, \quad (48)$$

$$\acute{a}_N(\theta_s,\phi_s)=[a_1^{0}(\theta_s,\phi_s)a_2^{-1}(\theta_s,\phi_s)\ \ldots\ a_N^{N-1}(\theta_s,\phi_s)]^T, \quad (49)$$

are respectively a vector of length $\mathcal{N}$ and a vector of length $\tilde{\mathcal{N}}$. The solution of linear systems of (45) may be expressed as $$h(\omega)=\Psi_N^{H}(\omega)[\Psi_N(\omega)\Psi_N^{H}(\omega)]^{-1}a_N(\theta_s,\phi_s), \quad (50)$$

$$\tilde{h}(\omega)=\tilde{\Psi}_N^{H}(\omega)[\tilde{\Psi}_N(\omega)\tilde{\Psi}_N^{H}(\omega)]^{-1}\tilde{a}_N(\theta_s,\phi_s), \quad (51)$$

with the entire beamforming filter then being $$\underline{h}(\omega)=[h^T(\omega)\tilde{h}^T(\omega)]^T. \quad (52)$$

Methods

Figure 2:
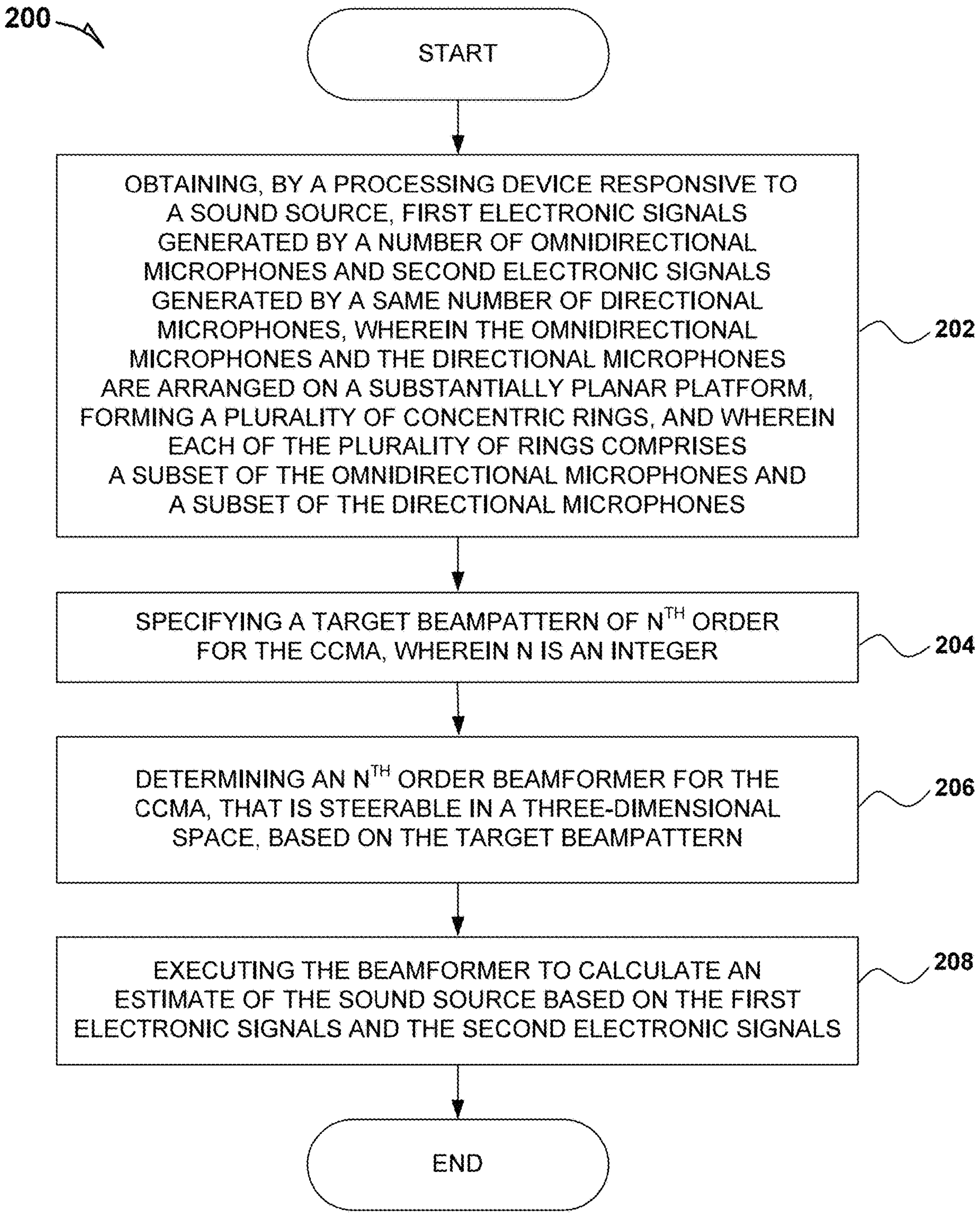
FIG. 2 shows a flow diagram illustrating a method for constructing a three-dimensionally (3D) steerable beamformer of $N^{th}$ order for the CCMA according to an implementation of the disclosure.

FIG. 2 shows a flow diagram illustrating a method 200 for constructing a three-dimensionally (3D) steerable beamformer of $N^{th}$ order for the CCMA (e.g., CCMA 100) according to an implementation of the present disclosure.

Referring to FIG. 2, a processing device may start executing operations for constructing the $N^{th}$ order 3D steerable beamformer for the CCMA and at operation 202 the processing device may obtain, responsive to a sound source (e.g., a sound source for source signal of FIG. 1), first electronic signals generated by a number (e.g., $K_p$ as described above with respect to FIG. 1) of omnidirectional microphones (e.g., microphones shown with no stripes in FIG. 1) and second electronic signals generated by a same number (e.g., $K_p$) of directional microphones (e.g., microphones shown with horizontal stripes in FIG. 1). For example, the electronic signals $\zeta_{p,k}(\omega, \theta, \phi)$ in (6) and $\varsigma_{p,k}(\omega, \theta, \phi)$ in (7) as described above with respect to FIG. 1. The omnidirectional microphones and the directional microphones may be arranged on a substantially planar platform (e.g., in the x-y plane of FIG. 1), forming a plurality of concentric rings (e.g., the number P of rings shown in FIG. 1), and each of the plurality of rings may include a first subset of the omnidirectional microphones and a second subset of the directional microphones (e.g., with both the first and second subsets having an equal number of microphones).

At operation 204, the processing device may specify a target beampattern of $N^{th}$ order for the CCMA, wherein N is an integer. As noted above with respect to FIG. 1, the ideal $N^{th}$ order directivity pattern with look direction of $(\theta_s, \phi_s)$ may be written as (20).

At operation 206, the processing device may determine an $N^{th}$ order beamformer for the CCMA, that is steerable in a three-dimensional space (e.g., the 3D space including the CCMA 100 and the source signal of FIG. 1), based on the target beampattern. As noted above with respect to FIG. 1, the beampattern 14 associated with the CCMA 100 may be expressed as (26) and then the beampattern of (26) may be equated to the ideal directivity pattern of (20) and have its order limited to N for the purpose of determining, e.g., based on solving the linear systems of (45), the entire beamforming filter as expressed by (52).

At operation 208, the processing device may execute the beamformer to calculate an estimate of the sound source based on the first electronic signals and the second electronic signals.

Figure 3A:
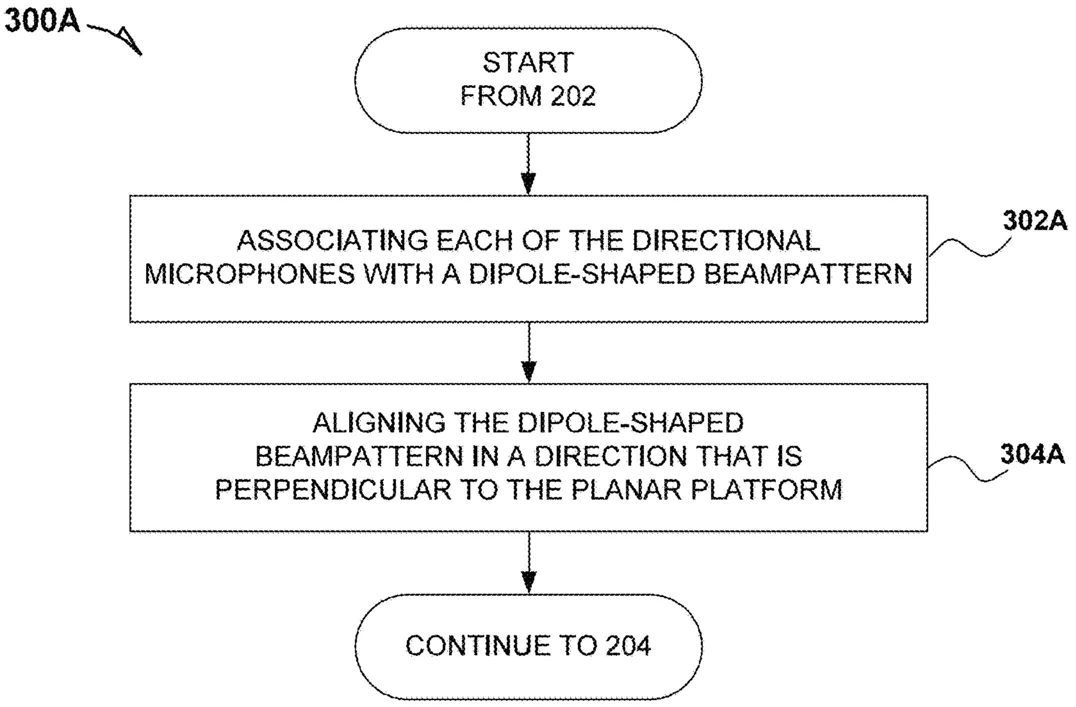
FIGS. 3A-3B show flow diagrams illustrating methods for constructing the 3D steerable beamformer of $N^{th}$ order for the CCMA according to implementations of the disclosure.
Figure 3B:
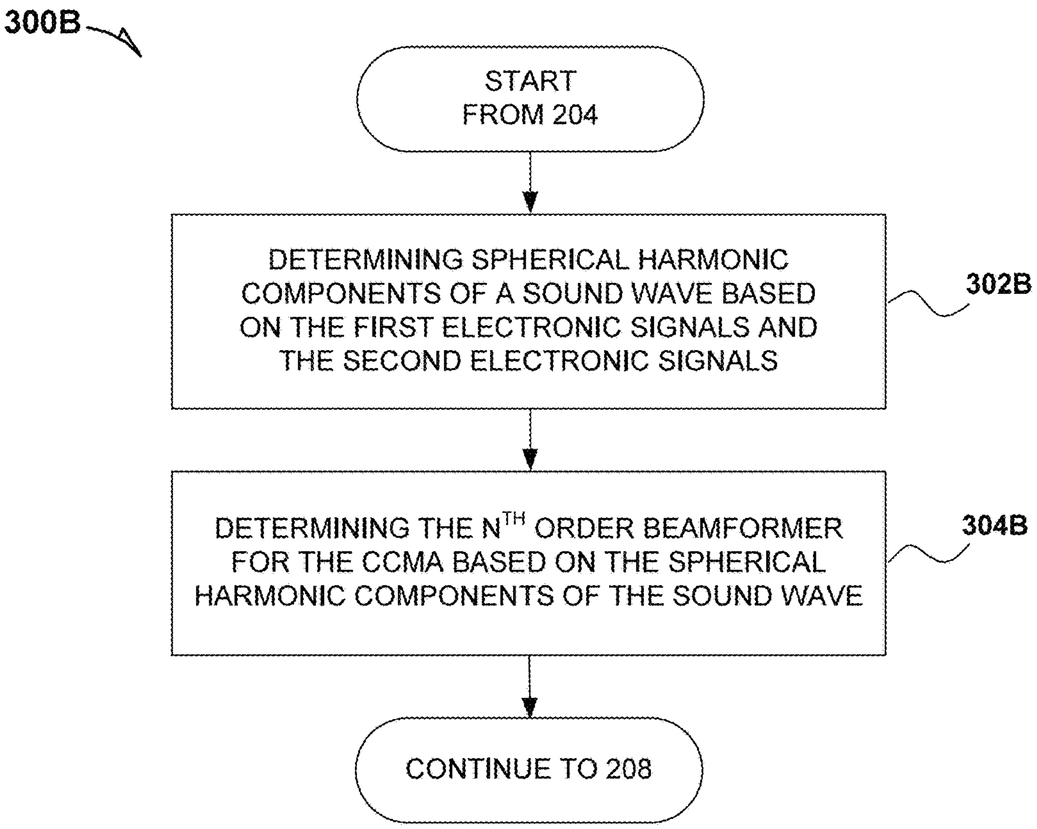

FIGS. 3A-3B show flow diagrams illustrating methods 300A and 300B for constructing the 3D steerable beamformer of $N^{th}$ order for the CCMA according to implementations of the disclosure.

Referring to method 300A of FIG. 3A, the operations may continue from operation 202 of method 200 of FIG. 2 and at operation 302A, each of the directional microphones (e.g., the microphones shown with horizontal stripes in FIG. 1) may be associated with a dipole-shaped beampattern. As noted above with respect to FIG. 1, in some implementations, each of the directional microphones may be associated with a same dipole-shaped beampattern. At operation 304A, each of the directional microphones with a dipole-shaped beampattern may be aligned in a direction that is perpendicular to the planar platform. As noted above with respect to FIG. 1, in some implementations, the dipole-shaped beampatterns may be aligned to an axis that is perpendicular to the plane that contains the sensors of CCMA 100 (e.g., the z-axis of FIG. 1). The method 300A may then continue to operation 204 of method 200 of FIG. 2.

Referring to method 300B of FIG. 3B, the operations may continue from operation 204 of method 200 of FIG. 2 and at operation 302B, spherical harmonic components of a sound wave may be determined based on the first electronic signals and the second electronic signals. As noted above with respect to CCMA 100 of FIG. 1, the processing device may determine spherical harmonic components of a sound wave (e.g., source signal of FIG. 1) based on the first electronic signals generated by the omnidirectional microphones and the second electronic signals generated by the directional microphones. Also as noted above with respect to FIG. 1, a plane wave may be expanded into a linear combination of spherical harmonics and, therefore, the unit amplitude plane waves corresponding to $\zeta_{p,k}(\omega, \theta, \phi)$ in (6) and $\varsigma_{p,k}(\omega, \theta, \phi)$ in (7) may be expanded into two (2) series of spherical harmonics of the sound wave, e.g., (24) and (25) as discussed above with respect to FIG. 1. At operation 304B, the $N^{th}$ order beamformer for the CCMA may be determined based on the spherical harmonic components of the sound wave. As noted above with respect to FIG. 1, the beampattern 14 associated with the CCMA 100 may be expressed in terms of the spherical harmonic components as (26) and then the beampattern of (26) may be equated to the ideal directivity pattern of (20) and have its order limited to N for the purpose of determining, e.g., based on solving the linear systems of (45), the entire beamforming filter as expressed by (52). The method 300B may then continue to operation 208 of method 200 of FIG. 2.

Simulations and Experiments

The performance of the 3D steerable beamformers proposed in this disclosure may be examined with a CCMA (e.g., like CCMA 100) composed of 2 rings, where the first ring with a radius of 1 cm, consists of 3 omnidirectional microphones and 3 directional microphones, and the second ring with a radius of 2 cm, consists of 7 omnidirectional microphones and 7 directional microphones, i.e., P=2, $K_1$=3, $K_2$=7, $r_1$=1 cm, $r_2$=2 cm.

Figure 4A:
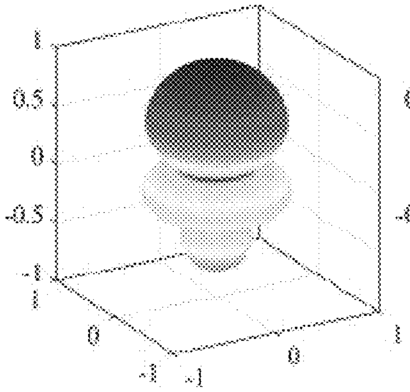
FIGS. 4A-4C show graphs of the associated beampatterns for the $N^{th}$ order 3D steerable beamformer at different look directions.
Figure 4B:
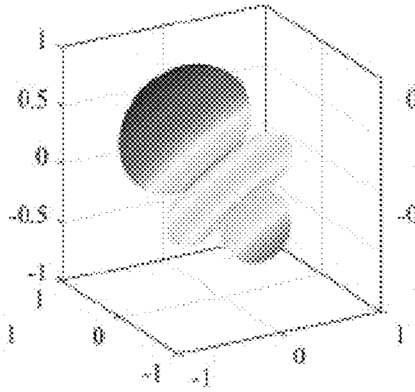
Figure 4C:
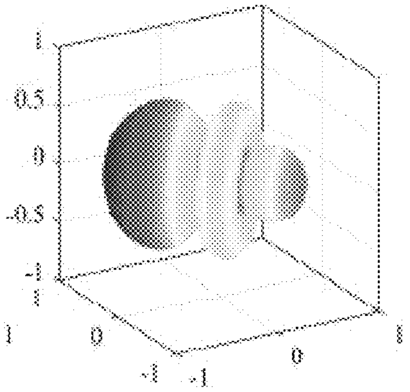

FIGS. 4A-4C show graphs of the associated beampatterns for the $N^{th}$ order 3D steerable beamformer at different look directions.

In order to demonstrate steering performance of the 3D steerable beamforming methods described herein, three different look directions may be tested with the 2 ring CCMA described above. In the examples of FIGS. 4A-4C, the look directions are defined by $(\theta_s, \phi_s)\in[(0°, 0°), (45°, 120°), (90°, 130°)]$ and each of these figures shows the plot of the beampatterns for each look direction at f=1 kHz.

FIG. 4A shows a graph of the beampattern of the $2^{nd}$ order 3D steerable beamformer (e.g., N=2) with $(\theta_s, \phi_s)$=(0°, 0°), FIG. 4B shows a graph of the beampattern of the $2^{nd}$ order 3D steerable beamformer with $(\theta_s, \phi_s)$=(45°, 120°), and FIG. 4A shows a graph of the beampattern of the $2^{nd}$ order 3D steerable beamformer with $(\theta_s, \phi_s)$=(90°, 135°). As is clear from FIGS. 4A-4C, the proposed 3D steerable beamformers achieved successful 3D beam steering and the respective beampatterns pointing to each of the three look directions are basically identical except for being rotated with respect to one another.

Figure 5:
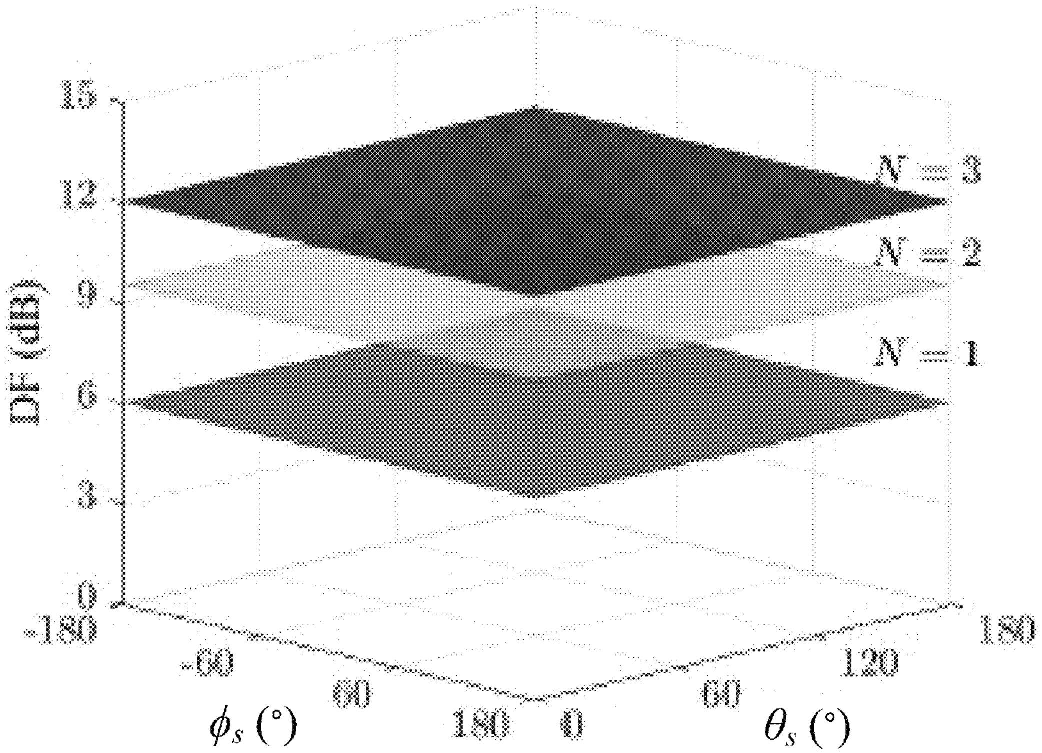
FIG. 5 shows a graph of the directivity factors (DF) of the $N^{th}$ order 3D steerable beamformer as a function of the different look directions.

FIG. 5 shows a graph of the directivity factors (DF) of the $N^{th}$ order 3D steerable beamformer as a function of the different look directions.

The DFs of the first-, second-, and third-order 3D steerable beamformers (e.g., N=1, 2, and 3) at f=1 kHz, respectively, are shown as a function of the steering (e.g., look) direction $(\theta_s, \phi_s)$. As is clear from FIG. 5, the value of the DF does not change with the steering direction $(\theta_s, \phi_s)$ for any of the $N^{th}$ order 3D steerable beamformers, which indicates that the beamformers are 3D steerable with consistently shaped beampatterns across the steering (e.g., look) angles.

Figure 6A:
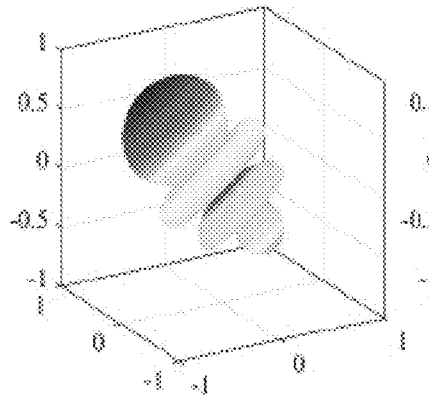
FIGS. 6A-6C show graphs of the associated beampatterns for the $N^{th}$ order 3D steerable beamformer at different frequencies.
Figure 6B:
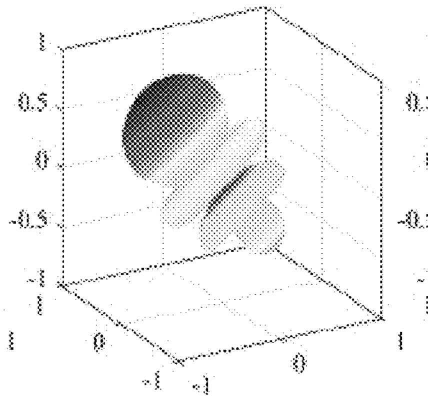
Figure 6C:
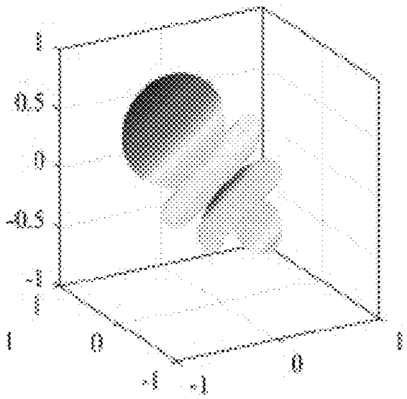

FIGS. 6A-6C show graphs of the associated beampatterns for the $N^{th}$ order 3D steerable beamformer at different frequencies.

The associated beampatterns, DFs and WNGs of the proposed $3^{rd}$ order 3D steerable beamformer (e.g., N=3) may be examined at different frequencies, with the steering (e.g., look) direction being set to $(\theta_s, \phi_s)$=(45°, 135°). FIG. 6A shows the associated beampattern at f=2 kHz, FIG. 6B shows the associated beampattern at f=4 kHz, and FIG. 6C shows the associated beampattern at f=6 kHz. As is clear from FIGS. 6A-6C, the associated beampatterns are basically identical across the different frequencies, which indicates that the associated beampatterns for the $3^{rd}$ order 3D steerable beamformer are frequency-invariant.

Figure 7A:
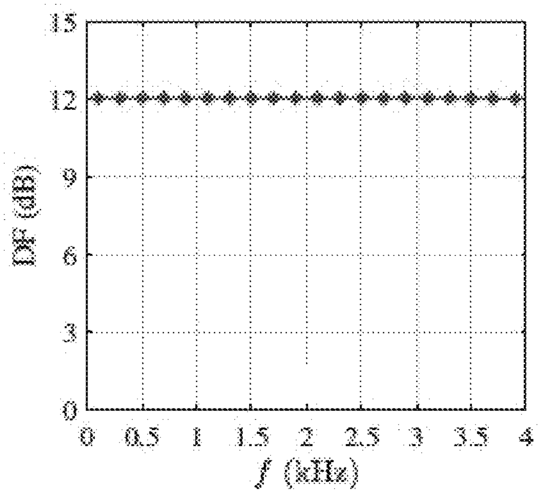
FIGS. 7A-7B show graphs of the associated white noise gain (WNG) and DF for the $N^{th}$ order 3D steerable beamformer at different frequencies.
Figure 7B:
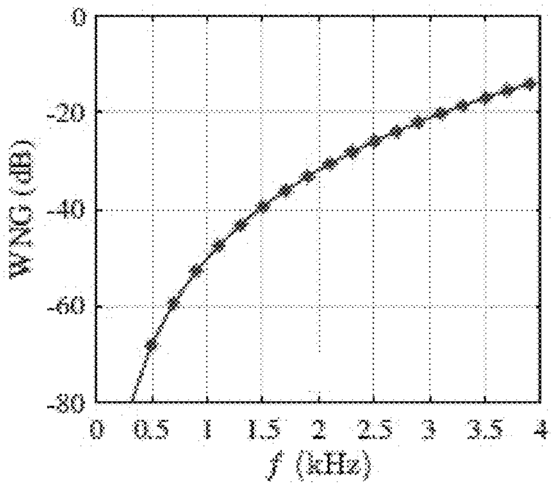

FIGS. 7A-7B show graphs of the associated white noise gain (WNG) and DF for the $N^{th}$ order 3D steerable beamformer at the different frequencies.

The DFs and WNGs of the proposed $3^{rd}$ order 3D steerable beamformer (e.g., N=3) may be examined at different frequencies, with the steering (e.g., look) direction being set to $(\theta_s, \phi_s)$=(45°, 135°). FIG. 7A shows the associated DF of the $3^{rd}$ order 3D steerable beamformer as a function of f=0 kHz to 4 kHz and FIG. 7B shows the associated WNG as a function of f=0 kHz to 4 kHz. As is clear from FIGS. 7A and 7B, the DFs are basically identical across the different frequencies with acceptable WNG values, which indicates that the DFs for the $3^{rd}$ order 3D steerable beamformer are frequency-invariant.

Processing System

Figure 8:
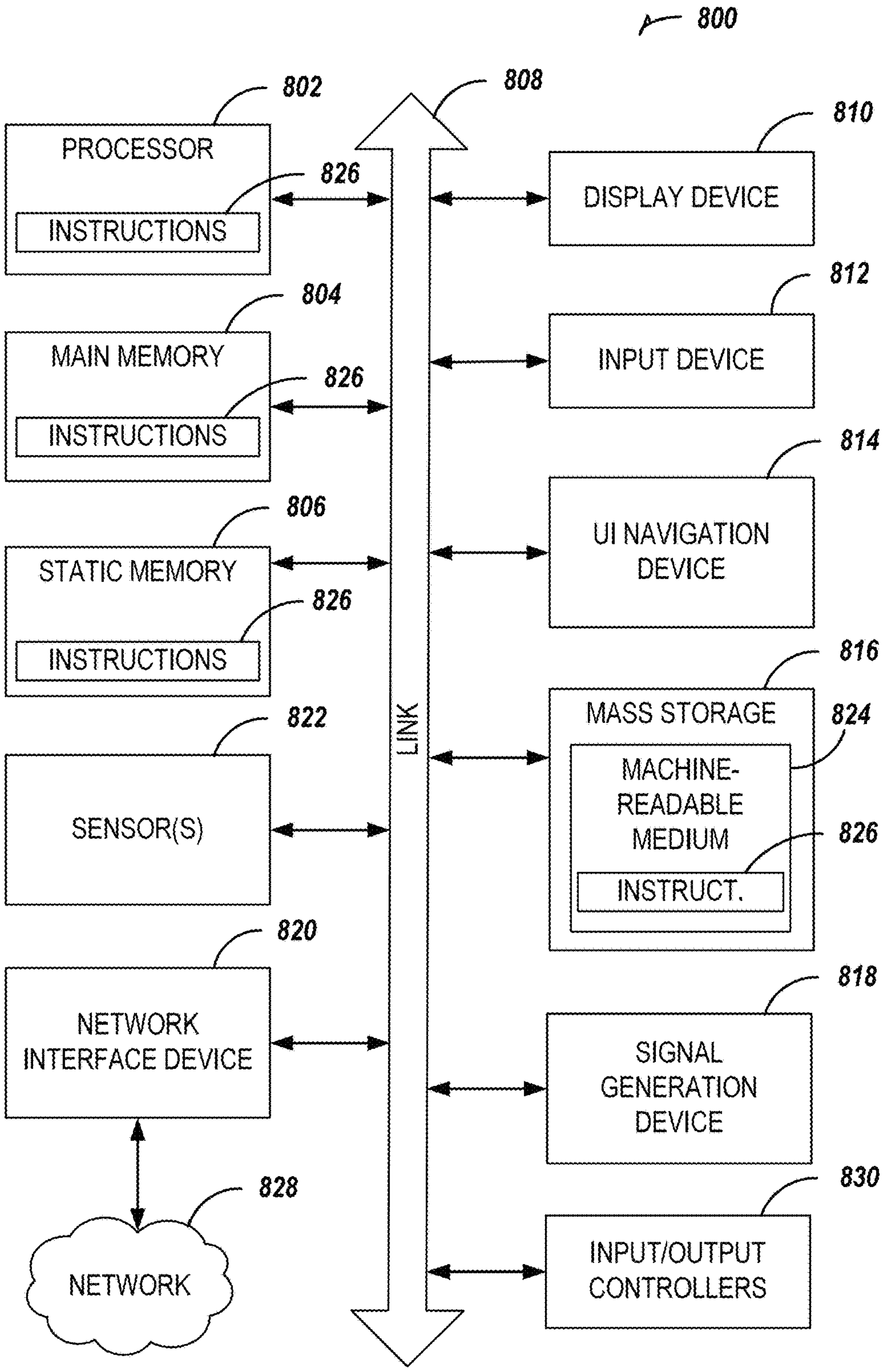
FIG. 8 is a block diagram illustrating a machine, in the example form of a computer system, within which a set or sequence of instructions may be executed to cause the machine to perform any one of the methodologies discussed herein.

FIG. 8 is a block diagram illustrating a machine, in the example form of a computer system 800, within which a set or sequence of instructions may be processed and executed to cause the machine to perform any one of the methodologies discussed herein.

In alternative implementations, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one implementation, the display device 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors 822, such as a global positioning system (GPS) sensor, compass, accelerometer, gyrometer, magnetometer, or other sensor.

The storage device 816 includes a machine-readable medium 824 on which is stored one or more sets of data structures and instructions 826 (e.g., software) embodying or utilized by any one or more of the methodologies or functions described herein. The instructions 826 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 824 is illustrated in an example implementation to be a single medium, the term "machine-readable medium" may include a single medium or multiple media (e.g., a centralized or distributed database, and/or associated caches and servers) that store the one or more instructions 826. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 826 may further be transmitted or received over a communications network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). Input/output controllers 830 may receive input and output requests from the central processor 802, and then send device-specific control signals to the devices they control (e.g., display device 810). The input/output controllers 830 may also manage the data flow to and from the computer system 800. This may free the central processor 802 from involvement with the details of controlling each input/output device.

Language

Some portions of the detailed description have been presented in terms of algorithms and/or symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation unless described as such.

The invention claimed is:

1. A concentric circular microphone array (CCMA) comprising:

a number of omnidirectional microphones and an equal number of directional microphones, wherein the omnidirectional microphones and the directional microphones are arranged on a substantially planar platform, forming a plurality of concentric rings, and wherein each of the plurality of rings comprises a subset of the omnidirectional microphones and a subset of the directional microphones; and a processing device, communicatively coupled to the omnidirectional microphones and the directional microphones, to:

responsive to a sound source, obtain first electronic signals generated by the omnidirectional microphones and second electronic signals generated by the directional microphones;

specify a target beampattern of $N^{th}$ order for the CCMA, wherein N is an integer;

determine an $N^{th}$ order beamformer for the CCMA, that is steerable in a three-dimensional space, based on the target beampattern; and execute the beamformer to calculate an estimate of the sound source based on the first electronic signals and the second electronic signals.

2. The concentric circular microphone array of claim 1, wherein each of the directional microphones is associated with a dipole-shaped beampattern, and wherein the dipole-shaped beampattern is aligned in a direction perpendicular to the planar platform.

3. The concentric circular microphone array of claim 1, wherein the CCMA is a uniform CCMA with the subset of the omnidirectional microphones and the subset of the directional microphones uniformly distributed on each of the plurality of rings.

4. The concentric circular microphone array of claim 3, wherein a spacing between each of the uniformly distributed microphones is smaller than a smallest acoustic wavelength of a specified frequency band.

5. The concentric circular microphone array of claim 1, wherein the $N^{th}$ order beamformer for the CCMA is further determined based on a beampattern associated with the beamformer being equal to the specified target beampattern of $N^{th}$ order.

6. The concentric circular microphone array of claim 1, further comprising the processing device to determine spherical harmonic components of a sound wave based on the first electronic signals and the second electronic signals and to determine the $N^{th}$ order beamformer for the CCMA based on the spherical harmonic components of the sound wave.

7. The concentric circular microphone array of claim 6, wherein the $N^{th}$ order beamformer for the CCMA is further determined based on an order n and degree m of at least one of the spherical harmonic components of the sound wave.

8. The concentric circular microphone array of claim 7, wherein the $N^{th}$ order beamformer for the CCMA amplifies at least one of the second electronic signals based on (n+m) being an odd number.

9. The concentric circular microphone array of claim 1, wherein the CCMA comprises a device configured to receive voice commands or a device configured for teleconferencing.

10. A method for beamforming with a concentric circular microphone array (CCMA), comprising:

obtaining, by a processing device responsive to a sound source, first electronic signals generated by a number of omnidirectional microphones and second electronic signals generated by a same number of directional microphones, wherein the omnidirectional microphones and the directional microphones are arranged on a substantially planar platform, forming a plurality of concentric rings, and wherein each of the plurality of rings comprises a subset of the omnidirectional microphones and a subset of the directional microphones;

specifying a target beampattern of $N^{th}$ order for the CCMA, wherein N is an integer;

determining an $N^{th}$ order beamformer for the CCMA, that is steerable in a three-dimensional space, based on the target beampattern; and executing the beamformer to calculate an estimate of the sound source based on the first electronic signals and the second electronic signals.

11. The method of claim 10, wherein each of the directional microphones is associated with a dipole-shaped beampattern.

12. The method of claim 11, wherein the dipole-shaped beampattern is aligned in a direction perpendicular to the planar platform.

13. The method of claim 10, wherein the CCMA is a uniform CCMA with the subset of the omnidirectional microphones and the subset of the directional microphones uniformly distributed on each of the plurality of rings.

14. The method of claim 13, wherein a spacing between each of the uniformly distributed microphones is smaller than a smallest acoustic wavelength of a specified frequency band.

15. The method of claim 10, further comprising determining the $N^{th}$ order beamformer for the CCMA based on a beampattern associated with the beamformer being equal to the specified target beampattern of $N^{th}$ order.

16. The method of claim 10, further comprising determining spherical harmonic components of a sound wave based on the first electronic signals and the second electronic signals and determining the $N^{th}$ order beamformer for the CCMA based on the spherical harmonic components of the sound wave.

17. The method of claim 16, further comprising determining the $N^{th}$ order beamformer for the CCMA based on an order n and degree m of at least one of the spherical harmonic components of the sound wave.

18. A concentric circular microphone array (CCMA), comprising:

a number (N) of omnidirectional microphones and an equal number (N) of directional microphones, wherein:

the omnidirectional microphones and the directional microphones are arranged in mixed pairs on a substantially planar platform, forming a plurality of concentric rings, each mixed pair comprising one of the omnidirectional microphones and one of the directional microphones;

each of the directional microphones is associated with a dipole-shaped beampattern aligned in a direction perpendicular to the planar platform;

each of the plurality of rings comprises a subset of the mixed pairs of omnidirectional microphones and directional microphones; and a processing device, communicatively coupled to the pairs of omnidirectional microphones and directional microphones, to:

responsive to a sound source, obtain first electronic signals generated by the omnidirectional microphones and second electronic signals generated by the directional microphones; and execute a beamformer to calculate an estimate of the sound source based on the first electronic signals and the second electronic signals.

19. The concentric circular microphone array of claim 18, wherein the CCMA is a uniform CCMA with the subset of the omnidirectional microphones and the subset of the directional microphones uniformly distributed on each of the plurality of rings.

20. The concentric circular microphone array of claim 19, wherein a spacing between each of the uniformly distributed microphones is smaller than a smallest acoustic wavelength of a specified frequency band.

* * * * *